United States Patent [19]

Nejame, Jr.

[11] Patent Number: 4,622,123
[45] Date of Patent: Nov. 11, 1986

[54] DEVICE FOR COMPRESSING A PAIR OF PLATES

[75] Inventor: Samuel Nejame, Jr., Medfield, MA

[73] Assignee: Ionics, Incorporated, Watertown, Mass.

[21] Appl. No.: 745,961

[22] Filed: Jun. 17, 1985

[51] Int. Cl.⁴ .............................................. B01D 13/02
[52] U.S. Cl. ................... 204/299 R; 204/301;
  269/229; 269/232; 269/233; 269/235
[58] Field of Search ............... 269/229, 231, 232, 233,
  269/235, 236; 204/299 R, 301

[56] References Cited

U.S. PATENT DOCUMENTS

| | | | |
|---|---|---|---|
| 313,991 | 3/1885 | Coons | 269/233 |
| 722,677 | 3/1903 | Crippen | 269/233 |
| 2,807,873 | 10/1957 | Weissenberger | 269/229 |
| 3,018,538 | 1/1962 | Gates | 269/233 |
| 3,341,441 | 9/1967 | Giuffrida | 204/182.4 |

Primary Examiner—John F. Niebling
Attorney, Agent, or Firm—Norman E. Saliba

[57] ABSTRACT

A device for compressing a pair of plates composed of a slotted post extending upright from one of the plates, arranged to pass through a port in the second of the plates, and a circular ramp member rotatably attached to the second of said plates, which ramp is positioned to engage the post slot. Upon rotation of the ramp, the post is drawn through the port resulting in a closing of the distance between or compression of the plates.

5 Claims, 4 Drawing Figures

DEVICE FOR COMPRESSING A PAIR OF PLATES

BACKGROUND OF THE INVENTION

1. Field of the Invention

The invention resides in the field of fastening devices and more particularly relates to a cam-shaped member in contact with a post, which cam is rotated to reduce the distance between the two plates.

2. Description of the Prior Art

The best-known example of a rotatable cam in contact with a post for drawing two plates or surfaces together is the nut and bolt. In that device, a circular ramp or thread is cut on the outside of the bolt and a matching thread is formed on the outside of the nut. The nut fits over the bolt and presses against one of the plates which the bolt passes through, the bolt being attached to the other of the plates to be fastened. As the nut is rotated, the bolt is forced forward or backward drawing the plates together, or, alternatively, releasing them.

The variations of this basic concept are so extensive and well-known that further elaboration is unnecessary. In contrast, the present invention employs a rotatable ramp which is positioned to one side of slotted post and is arranged to engage the slot such that upon rotation of the ramp the post is forced forward or backward in a manner akin to the function of the nut and bolt. For particular applications there are substantial advantages to this arrangement over the traditional nut and bolt.

For example, when used in a corrosive environment, the risk of seizing, as might more readily occur with threaded nuts and bolts, is reduced.

The likelihood of cross-threading and consequential stripping or jamming is eliminated.

As the ramp members are attached to one of the plates they cannot get misplaced or dropped.

In biological applications, where a low level of contamination is important, the elimination of threads reduces the surfaces where undesirable materials might accumulate. Further, smooth posts allow an easier insertion of gaskets or similar devices between the plates when the posts are used as alignment guides.

These and other features and advantages of the invention will become more apparent from the detailed description below.

SUMMARY OF THE INVENTION

The invention may be summarized as a device for compressing a pair of plates consisting of an upright slotted post attached or affixed to one of the plates and a rotatable ramp attached to the upper surface of the other plate in a position to engage the the post slot as the post extends through a port in the plate. As the ramp is turned, its surface bears against the upper surface of the post slot and forces the post upward. The plates are thus drawn together compressing either against one another or any gasket or similar material placed in between.

The amount of compression, or, more exactly, the space reduction between the plates is governed by the pitch of the ramp. The initial distance between the plates is set by the position of the slot on the post. More than one slot may of course be placed on each post for use at different distances.

Various means may be used to rotate the ramp including an allen nut head or a multifaceted nut assembly. A matching key wrench may be provided for use in close spaces.

Although the device can be used singly, it appears best suited when employed in multiples to compensate for the effect of the offset of the ramp from the post axis. As an example, it has been successfully used to apply clamping pressure to an electrodialysis stack comprised of membranes and spacers through which liquid flows. By proper arrangement of a plurality of these units the stack is completely sealed against leaks at its edges by compression between the two retaining plates.

The structure of the invention is more fully detailed in the drawing and description of the preferred embodiment which follow.

DESCRIPTION OF THE PREFERRED EMBODIMENT

Figure 1:
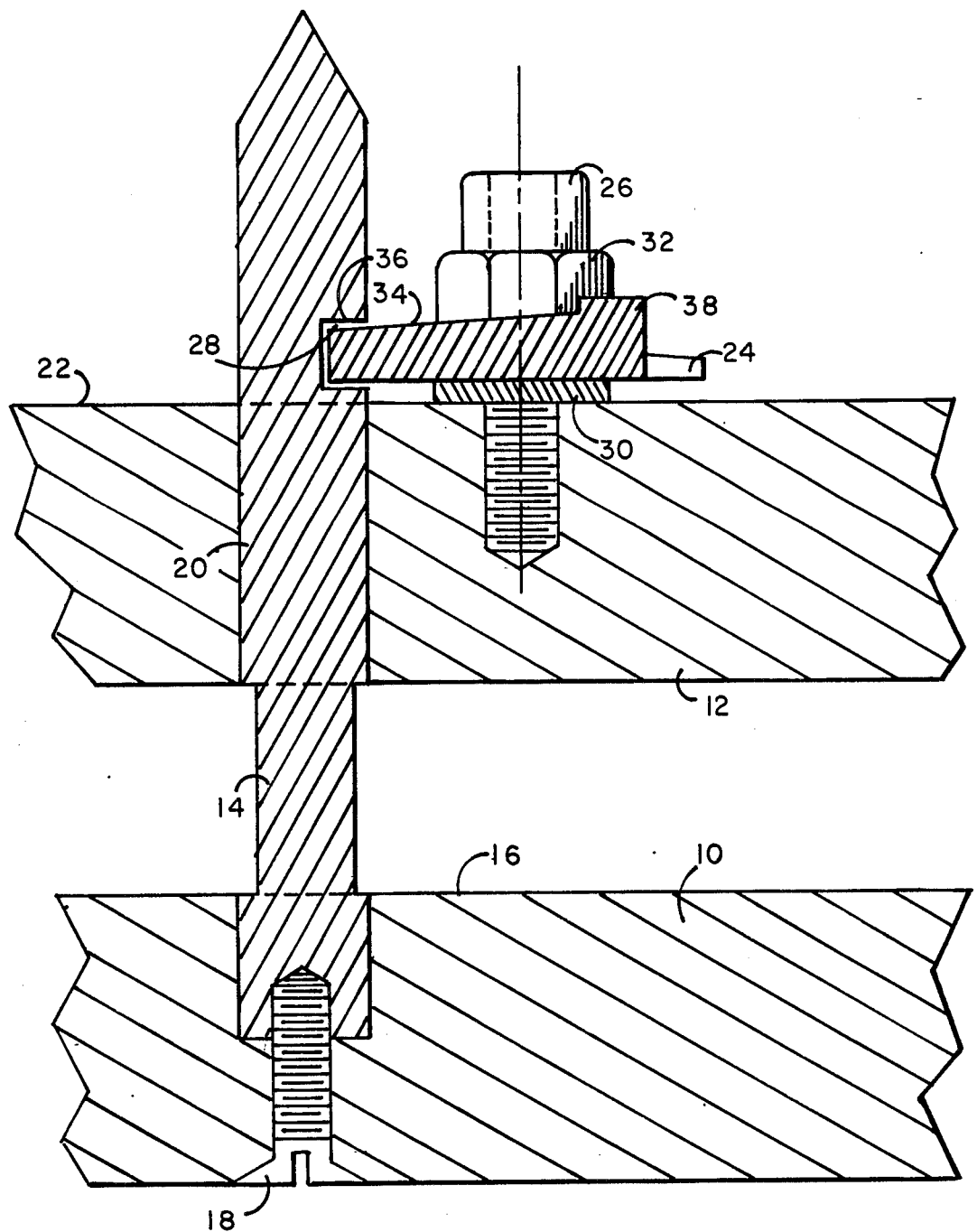
FIG. 1 is a cross-sectional view of the preferred embodiment of the invention.
Figure 3:
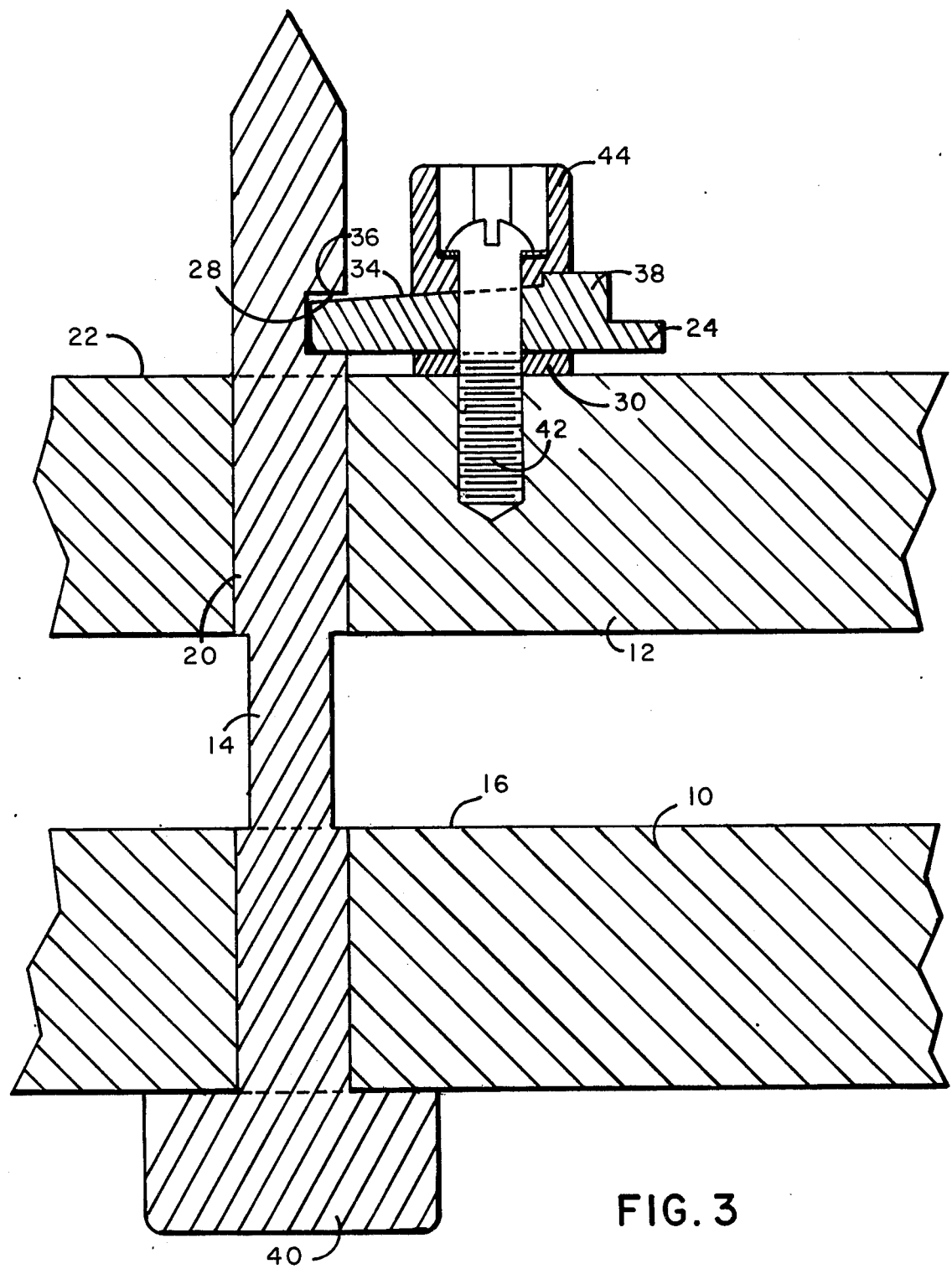
FIG. 3 is a cross-sectional view of an alternative embodiment of the invention.

Referring to FIG. 1, a cross-sectional view of the preferred embodiment is illustrated wherein the components of the invention are arranged to provide compression between end plates 10 and 12. Post 14 is attached to and extends upright from the upper surface 16 of plate 10. Any means may be used to secure the post, in this case screw 18 passing through plate 10 into the base of post 14. Alternatively and as is shown in FIG. 3, a bolt head 40 may be used to accomplish the same result. A simple weld may also be employed.

Post 14 passes through port 20 of plate 12 and extends beyond the upper surface 22 of plate 12 a selected distance as is required by the particular application of the invention. Ramp member 24 is rotatably mounted by an allen screw 26 in plate 12 to the side of post 14. It is positioned at a height and distance to engage slot 28 milled in post 14. Washer 30 provides a bearing surface and nut 32 attached to the ramp facilitates the rotation of the unit.

In operation, the ramp is rotated such that the upper surface 34 of the ramp in contact with the upper surface 36 of the slot forces the post upward as the height of the ramp increases. Counter-rotation allows post 14 to fall as the height of the ramp decreases. Stop 38 prevents the ramp from abruptly dropping from the highest point to the lowest. As post 14 is attached to plate 10, that plate is drawn toward or compressed against plate 12 by the upward movement of post 14. Obviously, the length of post 14, the positioning of the slot 28 and the pitch of ramp 24 all determine what final result is actually obtained but in all cases there is a relative closing of the distance between the two plates.

Figure 2:
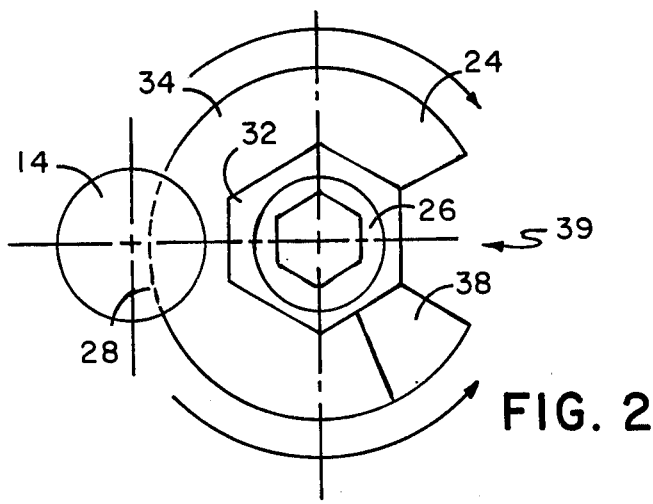
FIG. 2 is a top view of FIG. 1.

FIG. 2 is a top view of FIG. 1 wherein like numbers refer to like parts. Directional arrows indicate that the ramp may be rotated in either direction. Opening 39 in ramp 24 allows the plate 12 and the ramp to fit over post 14 prior to tightening.

Referring to FIG. 3 an alternative mechanical construction of the invention is shown in cross-section. Like numbers refer to like parts of FIG. 1. In this arrangement post 14 is attached to lower plate 10 by bolt head 40 which secures the post 14 against the plate in the upper transverse direction. Ramp 24 is secured to the plate 12 by screw 42 passing through allen head nut 44.

Washer 46 allows free rotation of the ramp by use of an allen wrench inserted in nut head 44. In all other respects the embodiment of FIG. 3 is the same in construction and operation as that of FIGS. 1 and 2.

Figure 4:
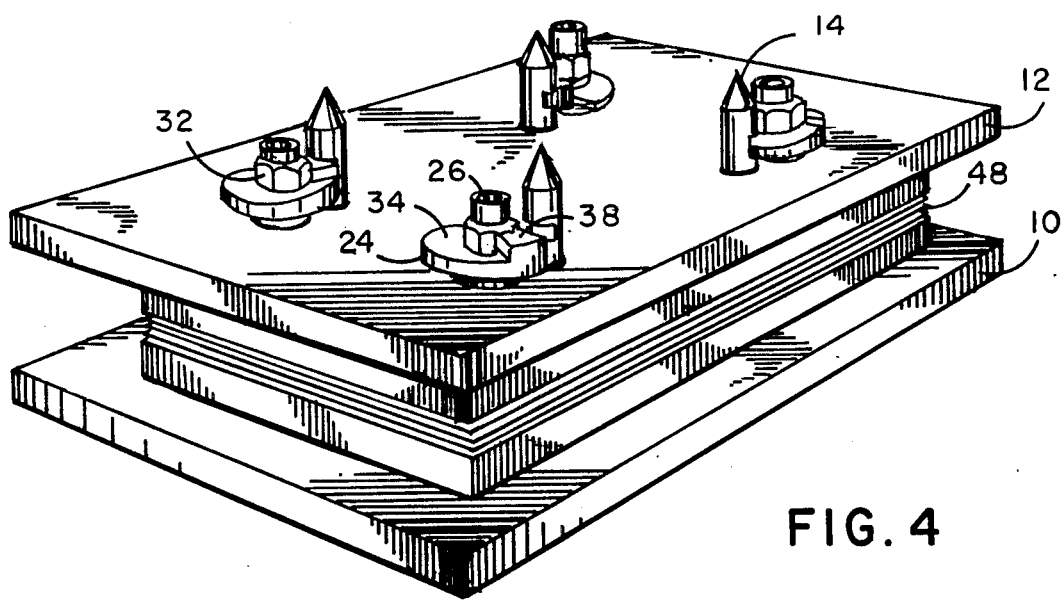
FIG. 4 is a perspective view of the invention applied to a pair of plates.

Referring next to FIG. 4, the preferred embodiment of FIGS. 1 and 2 is shown applied to a pair of plates which compress therebetween an electrodialysis membrane stack 48. This type of stack, (the construction of which is disclosed in U.S. Pat. Nos. 3,291,716; 3,341,441; 4,115,225; 4,210,511; 4,257,866; 4,303,493; and others) is composed of a plurality of membranes and liquid channeling spacers interposed between the membranes. The well-known purpose of such a stack is to provide a selective separation of ionic components dissolved within an aqueous solution when an electric field is applied across the apparatus. Salt-diluted and salt-concentrated streams emanate from the stack and the untreated feed stream enters at points not shown. The stack must be water-tight at its edges, the outer boundaries of each membrane separator spacer acting as a gasket upon compression. The above described invention is ideally suited to achieve this result and has been employed for this purpose. In particular it will be seen that the posts function particularly well to guide the stack components into alignment and to hold them in the correct position while sealing compression is applied.

As variations of the above device may be made without departing from the concept disclosed herein, the invention is accordingly defined by the following claims.

What is claimed is:

1. Means for compressing a pair of plates comprising in combination:
   a. A post attached to and extending upright from the upper surface of the first of said plates and further extending through the second of said plates; and
   b. A circular ramp member rotatably attached to the upper surface of the second of said plates, said ramp having an axis of rotation parallel to and offset from the axis of said post, said post having a slot for engaging said ramp whereby said post and said first plate are drawn toward said second plate upon rotation of said ramp.

2. The apparatus of claim 1 wherein said ramp has gripping means attached thereto to facilitate said rotation.

3. The apparatus of claim 2 wherein said gripping means comprises an allen nut head.

4. The apparatus of claim 2 wherein said gripping means comprises a multifaceted nut assembly.

5. The apparatus of claim 1 wherein an electrodialysis membrane stack is positioned and compressed between said pair of plates.

* * * * *